(12) United States Patent
McCune et al.

(10) Patent No.: US 6,711,828 B2
(45) Date of Patent: Mar. 30, 2004

(54) WARPAGE MEASUREMENT SYSTEM AND METHODS

(75) Inventors: Andrew S. McCune, Macon, GA (US);
Sandra S. Yates, Lizella, GA (US);
Clarence A. Ussery, Juliette, GA (US);
Gil V. Fuentes, Macon, GA (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/001,979

(22) Filed: Dec. 5, 2001

(65) Prior Publication Data

US 2003/0101608 A1 Jun. 5, 2003

(51) Int. Cl.⁷ .................................................. G01B 5/25
(52) U.S. Cl. ........................................ 33/533; 33/553
(58) Field of Search ....................... 33/1 V, 832, 833, 33/679.1, 549, 555, 551–554, 533

(56) References Cited

U.S. PATENT DOCUMENTS

| | | | | |
|---|---|---|---|---|
| 2,558,212 A | * | 6/1951 | Evans | 33/549 |
| 2,736,095 A | * | 2/1956 | Krauss | 33/1 R |
| 3,110,112 A | * | 11/1963 | Dalgleish | 33/552 |
| 3,273,251 A | * | 9/1966 | Saizon | 33/533 |
| 3,298,605 A | * | 1/1967 | Bucke et al. | 235/98 R |
| 4,417,351 A | * | 11/1983 | Williamson et al. | 377/8 |
| 4,535,463 A | * | 8/1985 | Ito et al. | 377/8 |
| 4,785,731 A | * | 11/1988 | Nguyen | 100/4 |
| 5,205,046 A | * | 4/1993 | Barnett et al. | 33/533 |
| 5,528,517 A | * | 6/1996 | Loken | 702/156 |
| 5,727,692 A | * | 3/1998 | Large et al. | 209/603 |
| 5,823,529 A | * | 10/1998 | Mandel et al. | 271/296 |
| 6,119,359 A | * | 9/2000 | Suzuki et al. | 33/832 |
| 6,219,141 B1 | * | 4/2001 | Perrault | 356/429 |
| 6,298,009 B1 | * | 10/2001 | Stringer | 367/99 |

\* cited by examiner

*Primary Examiner*—Christopher W. Fulton
*Assistant Examiner*—Amy R. Cohen
(74) *Attorney, Agent, or Firm*—Townsend and Townsend and Crew LLP

(57) ABSTRACT

A method for measuring the height variability of a stack of materials comprises placing a stack of materials onto a holder that comprises a base and at least two sides extending from the base such that the stack of materials rests on the base and is generally flush with the sides. A distance of a top of the stack of materials relative to a fixed plane is measured at various locations along the top of the stack of materials. The height variability of the stack is determined based on the measurements.

17 Claims, 6 Drawing Sheets

WARPAGE MEASUREMENT SYSTEM AND METHODS

BACKGROUND OF THE INVENTION

This invention relates generally to the field of measuring, and in particular to variability measurements. More specifically, the invention relates to measuring the extent of curvature or warpage found in stacked materials.

A wide variety of equipment is used to process various materials, such as paper sheets, envelopes, and the like. Examples of such equipment include copiers, printers, fax machines, mail processing equipment, and the like. Such equipment often uses a stack of materials to increase the efficiency of the process. For instance, mail processing equipment often utilizes a stack of envelopes or inserts into the envelopes when preparing mailings. As one specific example, an insert may be grasped from a stack and placed onto other materials that are to be inserted into an envelope. In turn, the envelope may also be grasped from a stack before receiving the materials.

In some cases, the materials may be curved or warped. As such, they may be difficult to grasp or move from the stack. This may cause a miss or a misfeed that may in turn stop operation of the equipment.

Hence, this invention is related to ways to measure variability in a stack of materials. Such measurements may then be used to determine if such materials are acceptable for certain equipment.

SUMMARY OF THE INVENTION

The invention provides various systems and methods for measuring the variability along the surface of materials that are stacked on top of each other. One such system and method comprises a holder having a base and at least two sides that extend upward from the base. With this configuration, a stack of materials may be placed onto the base and then positioned to be flush against the two sides. The system further includes a measuring device to measure the distance between a top of the stack of materials and a plane that is fixed relative to the base measurements are made at various locations along the top of the stack and these measurements are used to determine the height variability along the top of the stack. If the variability is too great, the materials may be rejected as being non-compliant and/or reworked until acceptable for use with the desired machine.

The fixed plane may be defined by the base so that the height measurements are made relative to the base. Markers may be placed along the walls so that visual measurements may be taken. Alternatively, the holder may include a top or a lid that is attached to the walls and is parallel to the base. In this way, the measurements may be taken relative to the lid. For example, the lid may include a plurality of holes through which a measuring device may be placed. For example, calipers may be placed through the holes and used to make the measurements. The two walls may be perpendicular to each other to define a corner into which a corner of the stack of materials may be inserted. Measurements may then be taken along x and y axis that are parallel to the two walls.

The systems and methods may be used to measure a wide variety of materials. For example, the materials may comprise envelopes, paper sheets, cardstock and the like.

The variability may be calculated manually or by a processor. For example, the measuring device may make electronic measurements that are transmitted to a processor that is configured to calculate the variability. Further the variability calculations may be made for various locations along the top of the stack of materials.

DESCRIPTION OF THE SPECIFIC EMBODIMENTS

Figure 1:
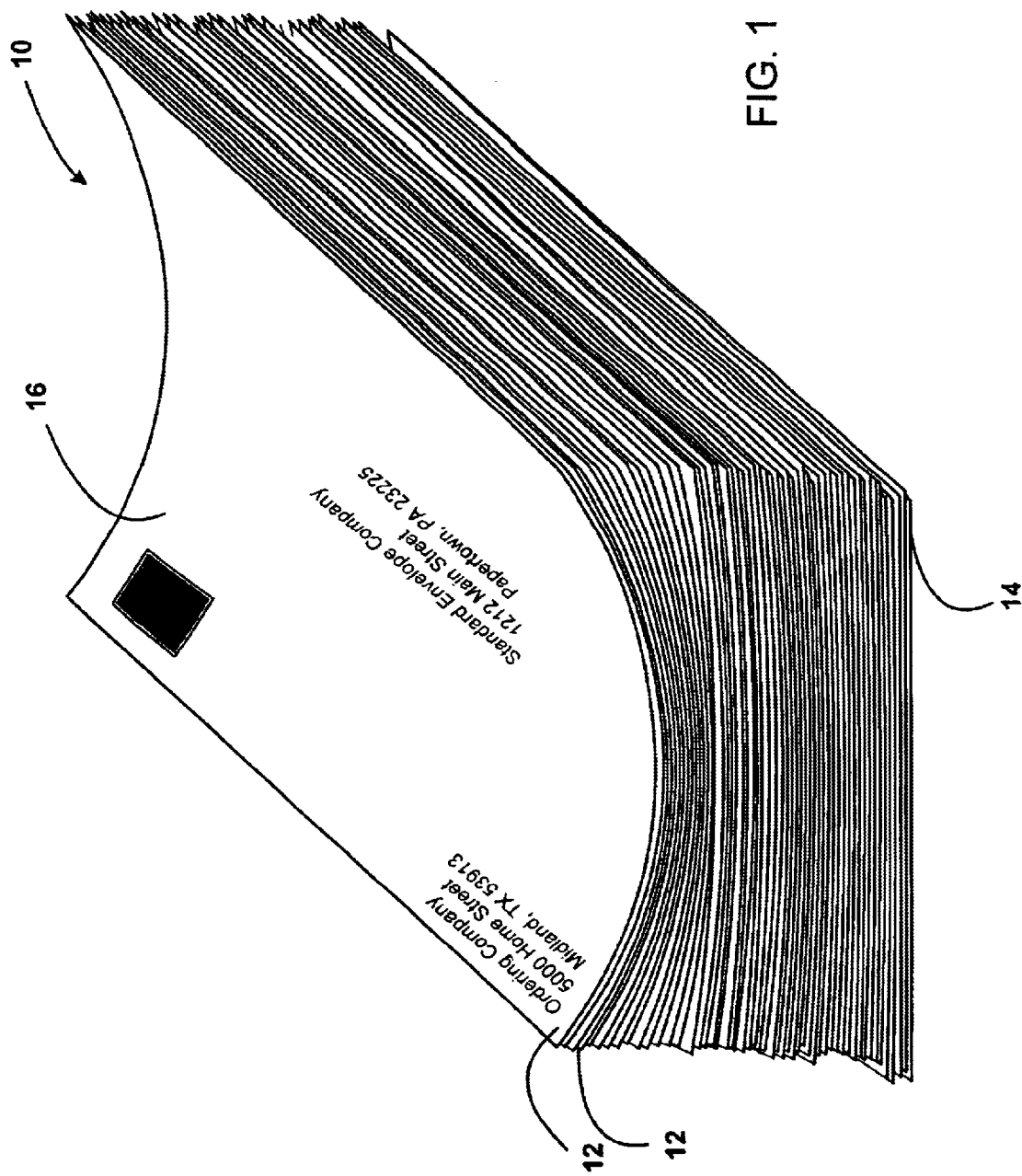
FIG. 1 illustrates a "C" curl in a stack of materials.

The invention provides for the measurement of surface variability of materials, particularly those that are stacked on top of each other. The surface variability may take the form of warpage or curvature of the materials. For example, the materials may be "C" shaped, "S" shaped or the like. The stacks of materials may be measured while each stack has about the same number of materials and at the same locations along the top of the stack. In this way, variations along the top of each stack may be calculated to determine if they are within acceptable limits for a given machine or piece of equipment.

The invention may be used to measure the variability in a wide variety of materials. For example, materials that may be measured include paper products such as sheets of paper, envelopes, cardstock, inserts for envelopes, folded pages, and the like as well as non-paper materials such as computer disks, optical disks, compact disks (CDs), DVDs, and the like.

Such materials may be used with a wide variety of machines and equipment, such as mail processing equipment, inserting machines, facsimile machines, printers, copiers and the like. Examples of mail processing equipment that may find use with such materials include those described in copending U.S. patent application Ser. Nos. 10/045,589 and 10/036,653, filed on Nov. 8, 2001, the complete disclosures of which are herein incorporated by reference. With such equipment, a stack of inserts may be placed within a hopper and individual inserts grasped and pulled from the bottom of the stack with suction arms. As an alternative, a swinging arm may be used to grasp individual inserts with jaws. Similar techniques may also be used to grasp envelopes. Other grasping techniques include the use of rollers, belts, and the like. In cases where the materials are too warped, the grasping mechanisms may not properly grasp the materials or may simply miss them altogether.

A variety of techniques may be used to measure the variability in the materials. This variability may be measured at various points along the top of the stack. Such techniques include visual measurements using a ruler, sound waves, light waves, including lasers, calipers, including mechanical or digital, and the like. This process may be automated by putting the measurements in electrical form and sending it to a processor.

The variability calculations and acceptable criteria may vary depend on the materials being evaluated as well as the equipment that they are to be used with. Further, the degree of variability may depend on the number of materials within the stack, where the variability occurs, and the like. As one non-limiting example, for an envelope to be used in an insert machine, for a stack of about 100 envelopes, the variability in the short direction may be about 0.125 inch (for a C-type curl), and about 0.0625 inch in the long direction (for an S-type curl). These variance values may be used as guidelines. As such, if the measurements exceed these values, the materials become suspect and may be rejected. However, it will be appreciated that the specific variances may change depending on the geometry, orientation, and characteristics of the material being measured, and the gage user may determine the tolerance based upon application requirements. For example, for flat materials to be used in a copier or fax machine, the variances may be much tighter.

Referring now to FIG. 1, one example of a stack 10 of envelopes 12 having surface variability will be described. Stack 10 has a bottom 14, a top 16 and four sides. A side view of the shortest side is shown in FIG. 1. As envelopes 12 approach the top 16, they begin to curl in the shape of a "C" as shown.

Figure 2:
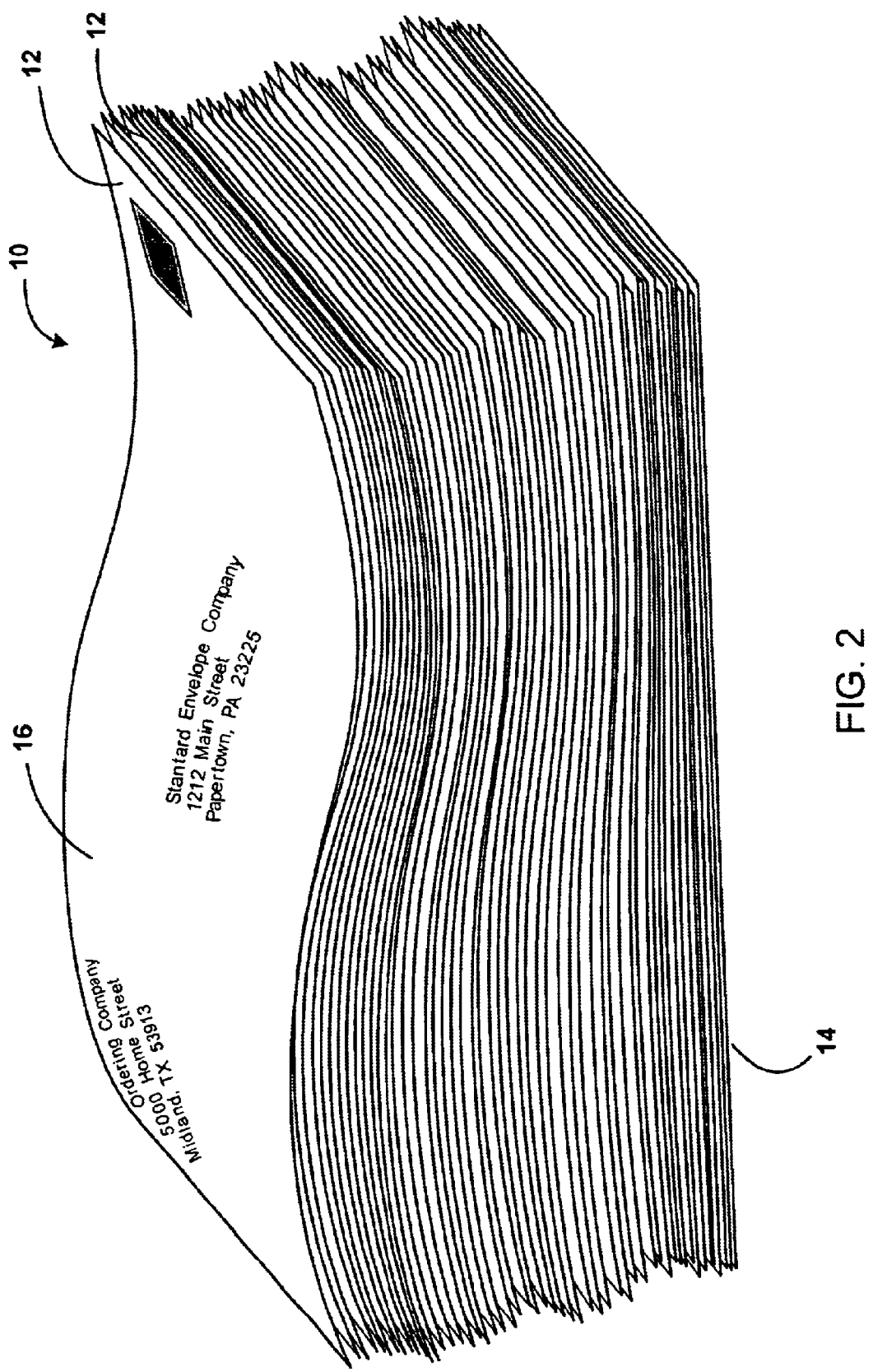
FIG. 2 illustrates an "S" curl in a stack of materials.

FIG. 2 illustrates stack 10 from an adjacent side. As shown, envelopes 12 begin to have an "S" shaped and as they approach the top 16 of stack 10. As previously described, such warpage can affect how individual envelopes 12 are removed from stack 10 by processing equipment.

Figure 3:
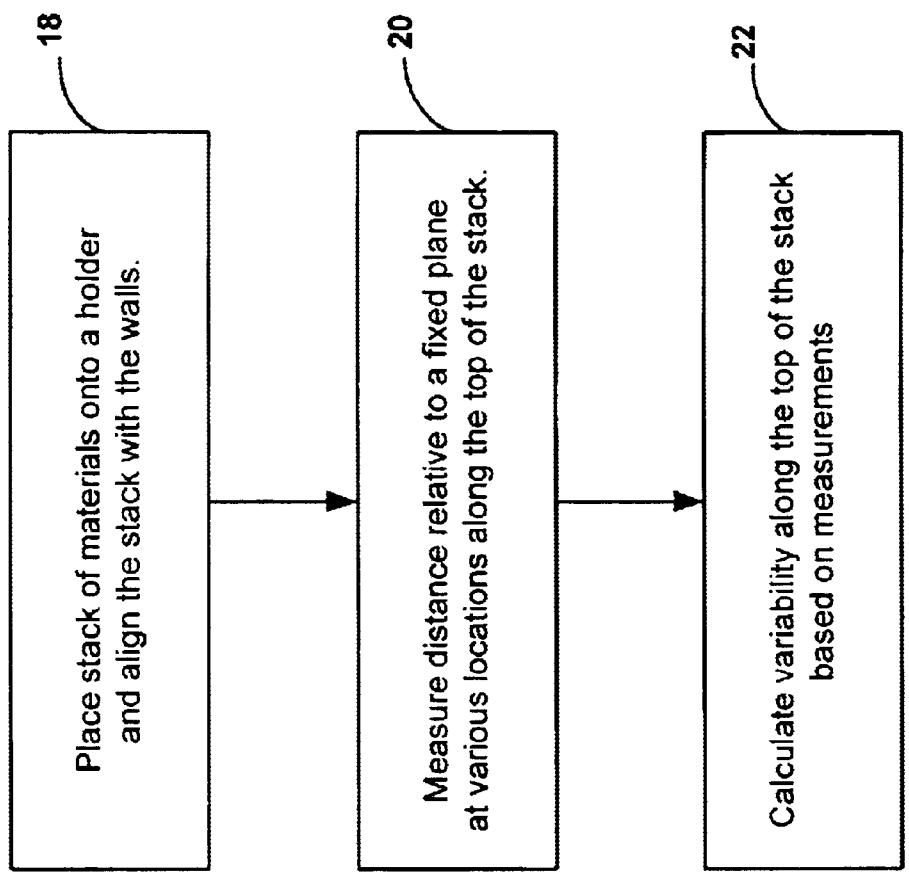
FIG. 3 is a flow chart illustrating a measuring method according to the invention.

FIG. 3 illustrates a method for measuring the variability of materials such as is shown in FIGS. 1 and 2 in order to determine if they are acceptable for use with a given piece of equipment. In step 18, a stack of materials to be measured is placed onto a holder having a pair of walls that are perpendicular to its base. The stack is positioned at a predetermined location, such as by inserting a corner of the stack into a corner defined by the two walls. In this way, the location of the stack relative to the holder is consistent each time measurements are made. As shown in step 20, a distance relative to a fixed plane is made at various locations along the top of the stack. The plane may be defined by the base of the holder, by a lid of the holder, or some plane in between. The measuring locations are preferably predefined and marked so that measurements for each stack of materials are made at the same locations. As shown in step 22, the measurements are used to calculate the variability along the top of the stack. For example, the measurement at one of the locations may be used as a baseline measurement, and the other measurements may be subtracted from the baseline. The absolute value of these differences may then be evaluated to see if they fall outside of an acceptable range of variability values, thereby indicating an unacceptable amount of non-flatness or warpage.

Figure 4:
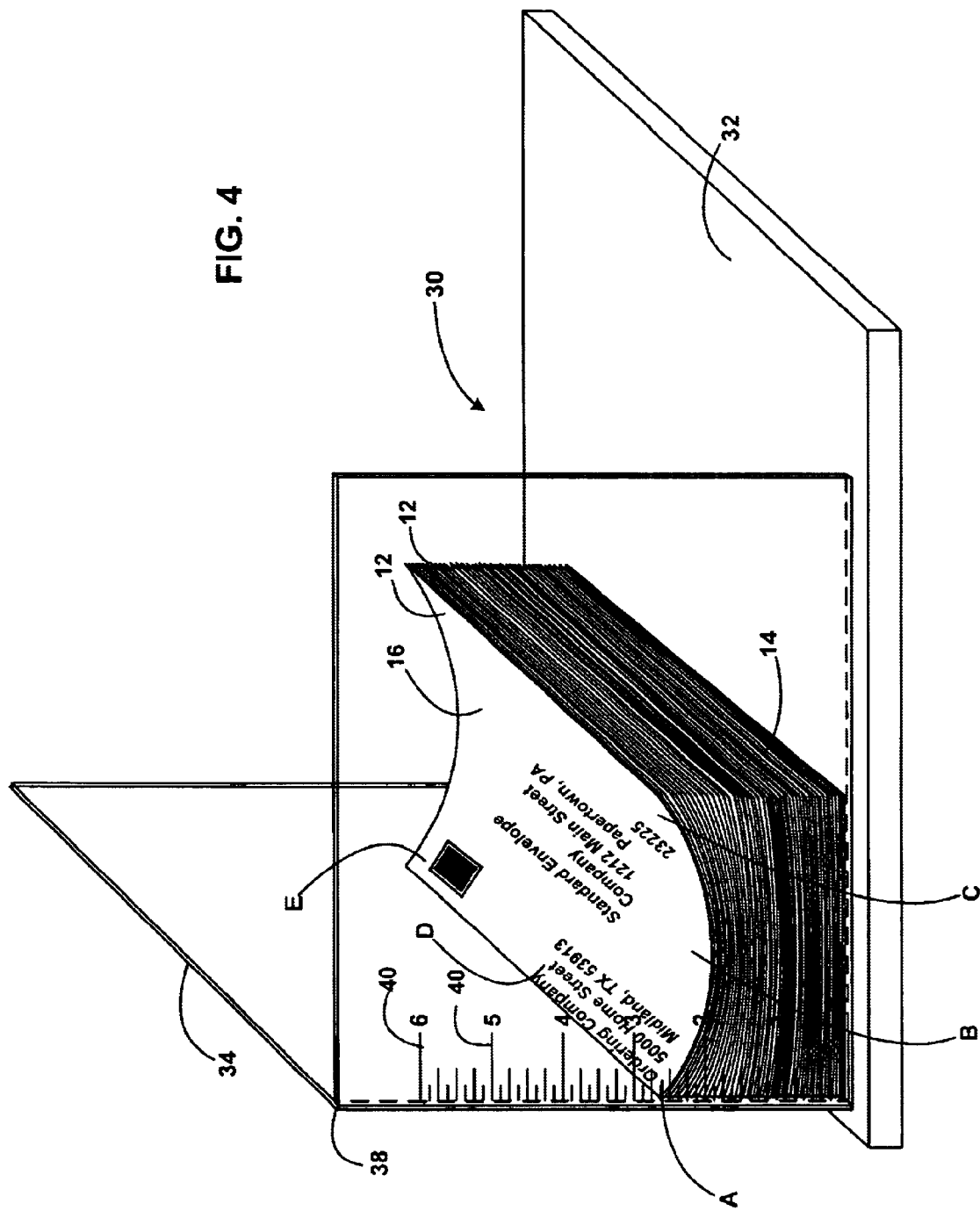
FIG. 4 is a perspective view of one embodiment of a measuring system according to the invention.

FIG. 4 illustrates one embodiment of a measuring system 30 that may be used to measure envelopes 12 of FIGS. 1 and 2, it being appreciated that system 30 may be used to measure the variability in other materials as well. System 30 comprises a base 32 and a pair of walls 34 and 36 that extend vertically from base 32. Walls 34 and 36 are perpendicular to each other to form a corner 38. Although shown as walls, it will be appreciated that other structures may be used as well, such as vertical posts, pins, and the like. The location where wall 34 contacts base 32 defines an x axis, and the location where wall 36 contacts base 32 defines a y axis.

With such a configuration, stack 10 is placed onto base 32 and two sides of stack 10 are made flush with walls 34 and 36 as shown. In this way, a corner of stack 10 is held within corner 38. This helps to ensure that each stack is placed onto base 32 at essentially the same location so that consistent measurements may be made from stack to stack. To also ensure consistency, each stack 10 should have about the same number of envelopes 12 and be placed onto base 32 in the same orientation.

At various locations along walls 34 and 36 are markings 40 that are used to visually measure the distance of top 16 relative to base 32. These measurements may be made at various locations along top 16 to determine the variability across top 16. For example, to determine the extent of a "C" curl, measurements may be taken at locations A, B, and C. For an "S" curl, measurements may be taken at locations A, D and E. Markings may be placed at other locations to measure the height at those locations as well.

Once the measurements have been made, variability calculations may be performed. For example, the variability along the short side may be made by selecting one of the measurements as the baseline and then subtracting the other measurements from the baseline value. Other statistical calculations may be performed as well. Once the calculations are made, they may be compared with acceptable values for certain pieces of equipment. In turn, the acceptance criteria may be empirically determined by running (pre-measured) warped materials through the machine and determining if they are appropriately processed.

With such a measuring system, a statistical sampling of a large set of materials may quickly be made to determine if the lot is acceptable. For instance, if the materials are shipped on a pallet, various samples may be taken from the pallet and placed into system 30 where measurements may be made.

Figure 5:
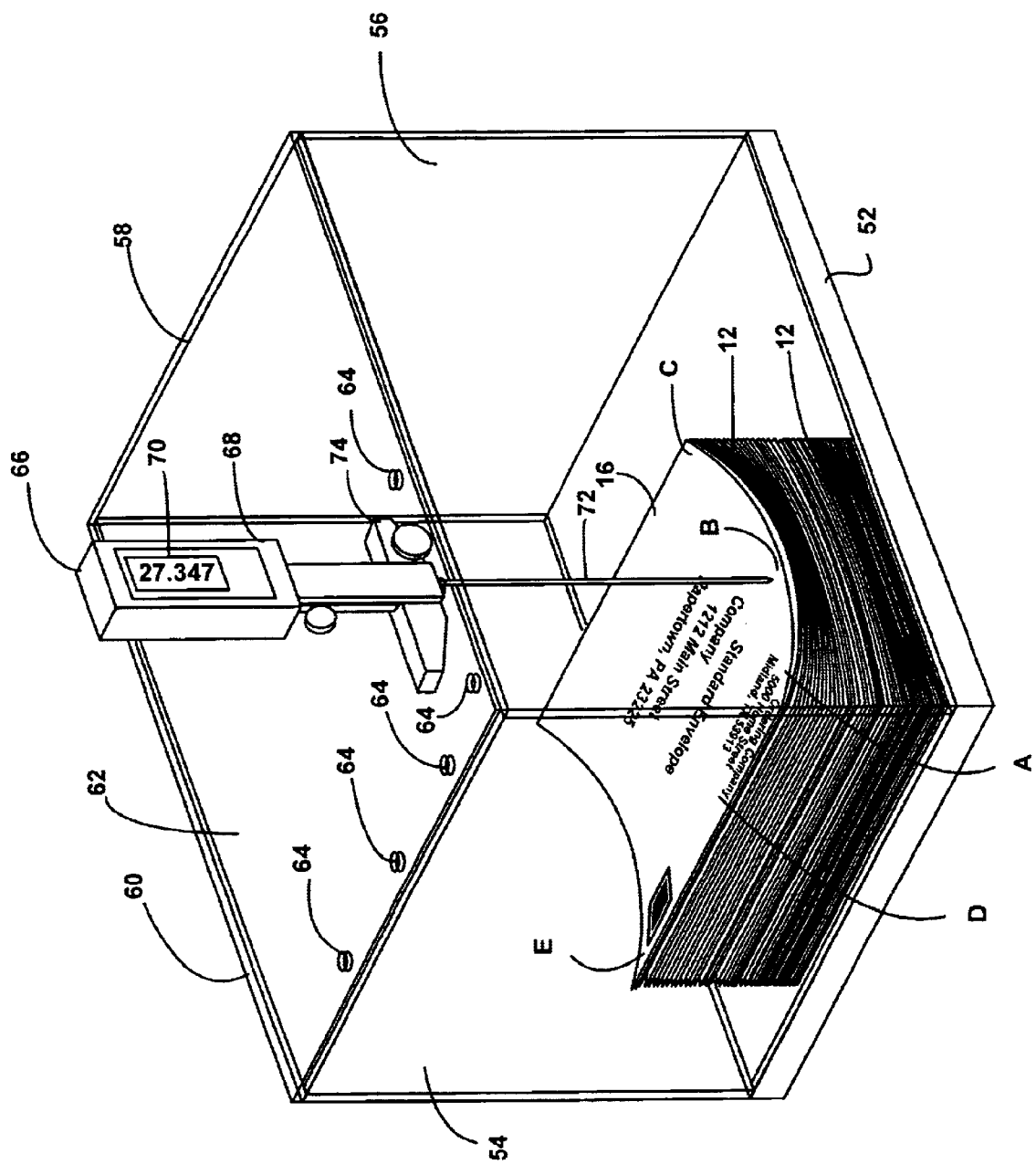
FIG. 5 is a perspective view of another embodiment of a measuring system according to the invention.

Referring now to FIG. 5, another embodiment of a measuring system 50 will be described. System 50 comprises a flat base 52 and four generally rigid walls, 54, 56, 58 and 60. The walls are both perpendicular to base 52 and to each other. Further, system 50 may be constructed of only two walls similar to system 30. Conveniently, walls 54–60 may be constructed of a transparent material, such as a clear plastic, or other type of rigid material, such as aluminum. System 50 also includes a top or lid 62 having a plurality of openings 64 that are formed at predetermined locations to permit variability measurements to be made at known locations each time. For example, when stack 10 is placed onto base 52 and aligned with walls 54 and 56, measurements may be taken at locations: A, B, C, D and E.

By using lid 62, the variability measurements may be comprised of the distance between lid 62 and top 16 of letters 12 at the various locations. A statistical analysis of the measurements may then be made in a manner similar to that previously described to calculate the surface variability of stack 10.

A variety of measuring instruments may be used to measure the distance including a simple ruler, a laser or the like. As shown in FIG. 5, a digital caliper 66 is employed to make the measurements. Calipers 66 comprise a processing unit 68 having a display 70 for numerically displaying the measured distances. Calipers 66 also include a depth or feeler gage 72 attachment. Alternatively, a dedicated digital feeler gage may be used. A T-bar 74 may also be included to allow caliper 66 to stand flush on lid 62. In this way, length or depth measurements may be made from lid 62 to top surface 16 at various locations defined by openings 64. The variability of top surface 16 may then be calculated by using one of the measurements as the baseline, and comparing the baseline to the other measurements in a manner similar to that previously described. However, it will be appreciated that other statistical analysis may be performed.

Optionally, a processor may be included within or coupled to caliper 66 to process the various measurements and to display a statistical analysis of the variability in addition to the measured distances. In some cases, the display may be a simple "pass" or "fail" depending on the evaluation criteria.

One advantage of system 50 is that when measuring materials that are generally desk top size, system 50 is portable and may be moved to any workstation of interest based upon measuring activities. As long as one wall and the base are perpendicular, base 52 does not need to rest on a perfectly flat surface, nor does it require leveling with a bubble device. However, such leveling may be made if desired.

Figure 6:
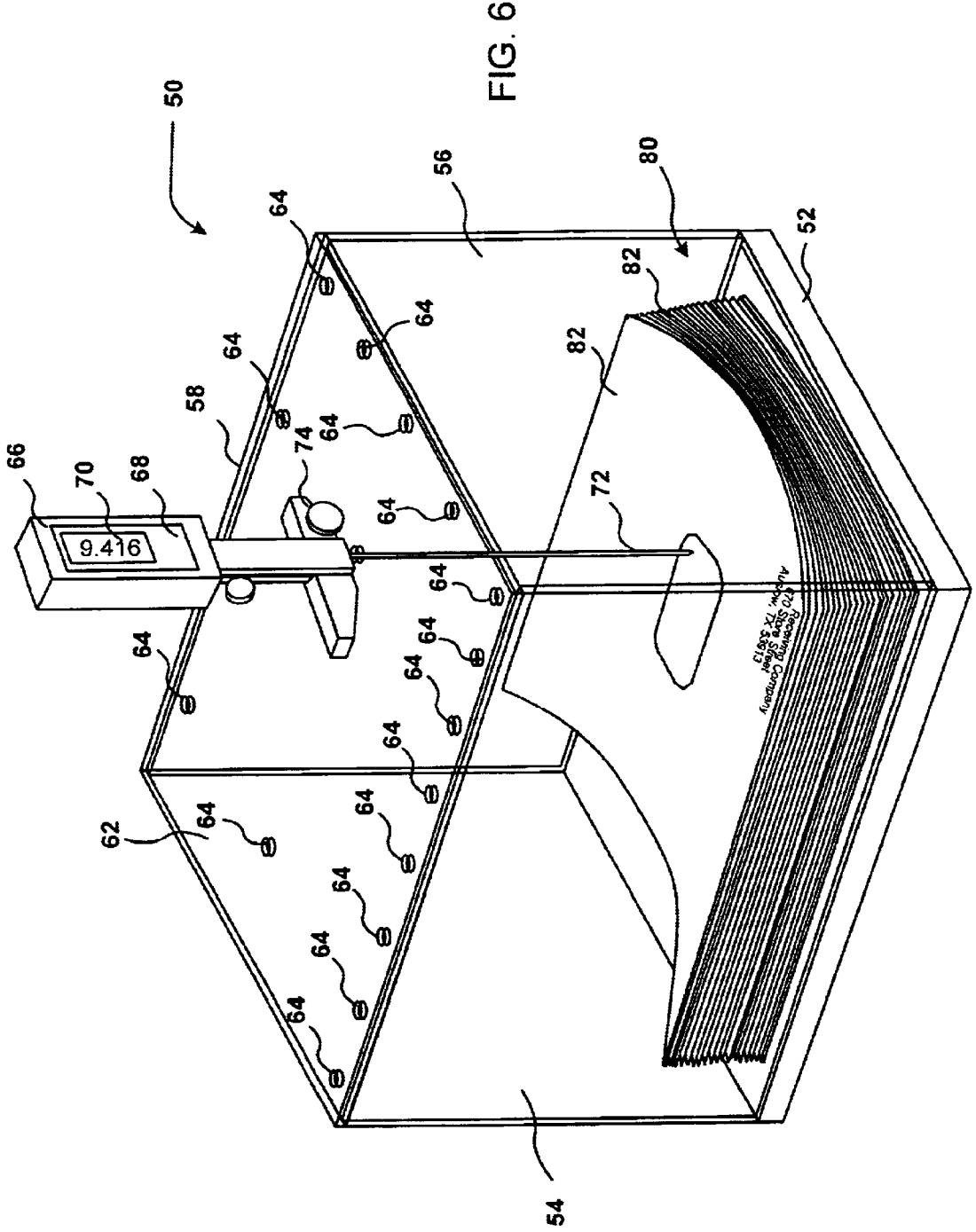
FIG. 6 illustrates the measuring system of FIG. 5 that has been modified to measure flat sheets according to the invention.

System 50 may be modified to measure other types of materials as well. For example, as shown in FIG. 6, system 50 has been modified to include additional holes 64 to permit measurements to be taken at various locations along a stack 80 of flat sheets 82, such a paper sheets. Measurements at various locations along the top surface of stack 80 may be made and evaluated in a manner similar to that previously described.

The invention has now been described in detail for purposes of clarity and understanding. However, it will be appreciated that certain changes and modifications may be practiced within the scope of the appended claims.

What is claimed is:

1. A method for determining warpage by measuring the height variability along a plurality of locations at the top surface of a stack of materials, the method comprising:

placing a stack of materials onto a holder that comprises a base and at least two sides extending from the base such that the stack of materials rests on the base and is generally flush with the sides;

measuring a distance of the top surface of the stack of materials relative to a fixed plane, separately at each of the locations along the top of the stack of materials; and determining the height variability of the stack based on the differences in the measurements at the plurality of locations.

2. A method as in claim 1, wherein the sides are perpendicular to the base and to each other to define a corner between two of the sides, and further comprising placing the stack of materials onto the base such that an edge of the stack of materials fits into the corner.

3. A method as in claim 1, wherein the fixed plane is defined by the base, and further comprising distance markers on the sides, and wherein the distances are measured by determining the location of the top of the stack of materials relative to the markers.

4. A method as in claim 1, wherein the holder further includes a lid that is parallel to the base, and wherein the lid defines the fixed plane.

5. A method as in claim 4, wherein the lid includes a plurality of openings, and wherein the distances are measured by placing a distance measurement instrument through the openings until contacting the top of the stack of materials.

6. A method as in claim 1, wherein the materials comprise paper products that are selected from a group consisting of sheets, envelopes and folded inserts.

7. A method as in claim 1, further comprising applying acceptance criteria to the determined variability, wherein the stack of materials comprise envelopes that have an acceptable variability if the determined variability is less than about 0.125 inch to about 0.0625 inch for up to about 100 pieces of materials in the stack.

8. A method as in claim 1, wherein an x axis and a y axis is defined where the sides contact the base, and wherein the height variability is determined at locations along the top of the stack that are parallel to the x axis and the y axis.

9. A method as in claim 1, wherein the distances are measured electronically, and further comprising processing the distances with a processor to determine the variability.

10. A measuring system for determining warpage in a stack of material, comprising:

a holder comprising a base and at least two sides extending from the base wherein the holder is adapted to hold the stack of materials such that the stack of materials is generally flush with the two sides;

a measuring device that is configured to measure the distance between each of a plurality of locations on a top of the stack of materials and a fixed plane, whereby the height variability of the stack of materials may be calculated from differences in the measurements; and a positioning device that is configured to permit the measuring device to be positioned at each of the locations along the top surface of the stack of materials.

11. A system as in claim 10, wherein the two sides are perpendicular to the base and to each other to define a corner, wherein the corner is adapted to receive an edge of the stack of materials.

12. A system as in claim 10, wherein the fixed plane is defined by the base, and further comprising distance markers disposed on the sides to permit the distance of the top of the stack of materials relative to the base to be measured.

13. A system as in claim 10, wherein the holder further includes a lid that is parallel to the base, and wherein the lid defines the fixed plane.

14. A system as in claim 13, wherein the lid includes a plurality of openings, wherein the positioning device comprises the lid, and wherein the measuring device is configured to be placed through the openings to measure the distance between the lid and the top of the stack of materials.

15. A system as in claim 10, wherein the materials comprise paper materials that are selected from a group consisting of sheets, envelopes and folded inserts.

16. A system as in claim 10, wherein an x axis and a y axis are defined where the sides contact the base, and wherein the measuring device is configured to measure the distances at locations along the stack that are parallel to the x axis and the y axis.

17. A system as in claim 10, wherein the measuring device is configured to produce the measurements in electronic form, and further comprising a processor that is configured to calculate the height variability based on the measurements.

* * * * *